United States Patent Office 3,398,019
Patented Aug. 20, 1968

3,398,019
METHOD FOR FIREPROOFING CELLULOSIC MATERIAL
Robert P. Langguth, Overland, and Howard L. Vandersall, Ballwin, Mo., assignors to Monsanto Company, St. Louis, Mo., a corporation of Delaware
No Drawing. Filed Feb. 21, 1963, Ser. No. 260,322
5 Claims. (Cl. 117—138)

The present invention relates to a method for the fireproofing of cellulosic materials.

The materials which may be treated according to the invention are denoted herein as wood fiber products and include boards or panels made from ligno-cellulosic fibers or particles, or agglomerates thereof such as heat and sound-insulating panels or tiles.

The use of wood fiber insulation board and acoustical panels have gained widespread acceptance in the building trades. However, the flammability of these products seriously restrict their use in certain applications. The flammability of certain types of wood fiber insulation board, particularly acoustical tiles, have been reduced by painting the board with an intumescent paint. Such expedients have not as yet produced a commercial product with satisfactorily low flame spread ratings for a non-flammable building material. As far as is known only by the use of a chemical retardant which impregnates the board can a commercially acceptable building material be produced which is capable of securing a non-flammable rating.

It is known that certain ammonium salts and more particularly ammonium phosphates, i.e., monoammonium dihydrogen and diammonium hydrogen ortho phosphate, can be used to reduce the flammability of such cellulosic materials. These materials are believed to function by decomposing below flame temperatures and releasing phosphoric acid which then esterifies the cellulose to result in a material which upon decomposition produces less of the highly flammable gases and tars. These salts are particularly desirable because of their effectiveness as both flameproofers and glow retardants. However, it has not been possible to generalize the use of such salts, and particularly the use of the ammonium phosphates, as extensive as is desirable. One serious problem has been the discoloration experienced during the drying operation of the cellulosic products impregnated with the ammonium phosphates. It is believed that this discoloration is due to the decomposition of the ammonium phosphates into phosphoric acid and ammonia with the acid dehydrating or charring the cellulose.

To understand and appreciate this problem it is well to note that in general, for preparing wood fiber products, drying temperatures in excess of the decomposition temperatures of the ammonium phosphates are normally used. In order to prevent or minimize discoloration, therefore, it is necessary for the drying temperatures to be reduced below the decomposition temperatures of the ammonium phosphates thus requiring a longer drying time in order to produce a substantially "dry" product. It can, therefore, be appreciated that a process which permits normal drying temperatures, i.e., temperatures above the decomposition temperatures of the ammonium phosphates, and normal drying times, in making an ammonium phosphate fire retardant wood fiber product would allow the important advantage, among others, of greater economy in the process, this being especially advantageous in these low cost, highly competitive products.

By decomposition temperature of the ammonium phosphates as used herein is meant the temperature at which the ammonium phosphate retardant decomposes to an extent that discoloration of the wood fiber product reaches an objectionable level when drying to a low moisture content and for monoammonium phosphate is generally about 285° F. and for diammonium phosphate is generally about 170° F.

By drying temperatures as used herein is meant the surface temperature of the wood fiber product which is attained in the drying operation.

It is, therefore, an object of this invention to provide an improved process for producing a fire retardant wood fiber product which is not objectionable because of discoloration.

It is another object of this invention to provide a process for producing a fire retardant wood fiber product which is not objectionable because of discoloration by using normal or standard drying conditions.

It is a further object of this invention to provide a process for preventing or minimizing the discoloration of wood fiber products impregnated with a fire retardant, such as the ammonium phosphates, when processed according to normal or standard drying conditions.

It is a still further object of this invention to provide a process for preventing or minimizing the discoloration of wood fiber products impregnated with a fire retardant, such as the ammonium phosphates, when processed at drying temperatures in excess of the decomposition temperatures of the fire retardants.

These and other objects will become apparent from a reading of the description and appended claims.

It has been found that drying temperatures in excess of the decomposition temperatures of the ammonium phosphates may now be used to produce fire retarded wood fiber products which have an acceptable color by incorporating therein a minor amount of a "decomposition inhibitor" as will be more fully discussed hereinafter.

Decomposition inhibitors suitable for use in the present invention are, in general, nitrogenous compounds which decompose to form ammonia below the decomposition temperatures of the ammonium phosphates and preferably decompose at a rate which allows relatively steady or uniform decomposition throughout the drying cycle with their substantially complete decomposition by the end of the completed drying cycle or time. In addition, for ease of application they preferably should be water soluble. In particular, inorganic ammonium compounds, such as the ammonium salts containing non-oxidizing anions, i.e., halides, $CO_3^{2-}$, $S^{2-}$, and yielding ammonia on decomposition, as well as the hydroxy amine salts, such as the chloride salts, can, in many cases be used. In addition, organic nitrogenous compounds, such as the amides and amidines, and in particular, those having a low molecular weight, i.e., less than about 100, and containing less than about 4 carbon atoms, can, in many cases be used. Such nitrogenous organic compounds include urea, formamide, acetamidine and guanidine, with urea being preferred because of its relative low cost and availability.

The term decomposition inhibitor is used herein for clarity and in no way is intended to describe or indicate their method of functioning. Although the mechanism of the decomposition inhibitors is not fully understood, the performance exhibited by the minor amounts of the aforementioned nitrogenous materials in preventing or minimizing discoloration at such relatively high temperatures is believed to be truly surprising and totally unexpected especially in view of the fact that it has been determined that there does not appear to be a reaction product formed between the nitrogenous materials and the ammonium phosphates.

Normally only small amounts of the decomposition inhibitor are required depending upon, inter alia, the temperature and time of the drying operation. It is preferred that weight ratios of about 1:0.1 to 1:0.5 ammonium phosphate to decomposition inhibitor be used and in no event should a weight ratio greater than 1:1 be used because of the deleterious effects which the excess of the inhibitor has on the finished product, such as lowering the strength of the product and, with regard to such nitrogenous bases as urea which is hygroscopic, tends to draw moisture to the product which is highly objectionable, as well as the deleterious effects which the excess of the inhibitor might have on the process and drying equipment.

In general, the method of producing the cellulosic material is as follows:

(1) A pulp is prepared from wood fibers such as southern pine, cotton wood, willow, Douglas fir, and hemlock, and in some instances these fibers are treated with chemicals for digestion. An aqueous slurry of pulp is then formed which can vary in solids content but is usually in the order of about 1% by weight.

(2) The pulp is formed, most generally into sheets, and is then pressed to a desired density, usually about 10 to 25 lb./cu. ft., which is most generally accomplished by pressure with the pressed tile containing a substantial amount of water, sometimes as high as 50% by weight.

(3) The pressed panel is then dried, usually in ovens, and is most generally carried out at drying temperatures from about 270° F. to 500° F. for periods of time ranging from about 30 minutes to about 120 minutes. Sometimes the drying operation is accomplished in step wise fashion by using relatively high temperatures for a relatively short period of time followed by using a relatively low drying temperature for a relatively long period of time. The degree of dryness is usually determined by the percent moisture remaining in the panel immediately after completion of the drying operation and the standard for a dry board, that is to say, a board considered to be substantially "dry," is generally between about 1 to 9% remaining moisture. With respect to discoloration, in general the drying temperatures employed are proportional to the percent moisture in the product, i.e., high drying temperatures may be employed only on products containing a relatively high percent moisture otherwise discoloration of the product will occur. When using normal drying procedures and nonretarded products drying temperatures above about 400° F. will discolor to an objectionable degree products containing less than about 10% moisture. Therefore, for products which are to have a low percent moisture content and are to be considered substantially "dry," drying temperatures below about 400° F. should be employed.

When fire retardant agents, such as the ammonium phosphates, are used they are normally incorporated into the board prior to the drying operation. They can be added to the pulp either in the solid form or dissolved in an aqueous medium during the slurrying of the pulp or they can be applied to the surface of the formed product by being dissolved in an aqueous medium by such procedures as immersion, brushing, sprinkling, atomization and the like. Normally amounts necessary to give effective flame ratings are usually within the range of about 5 to 30% by weight of the panel on a dry basis with an amount of about 15% being adequate for a homogeneously impregnated product.

The decomposition inhibitor can be incorporated by any manner into the product but it is preferably added to the product either in the solid form or dissolved in an aqueous medium during the slurrying of the pulp but it may also be applied to the product by being dissolved in an aqueous medium and then applied by such procedures as immersion, brushing, sprinkling, atomization and the like. It is especially preferred, however, to dissolve the decomposition inhibitor and the fire retardant in an aqueous medium and admix with the pulp during the slurrying operation.

As being representative of the invention, tiles 12 x 12 x ½ inches having a dry density of about 17 lbs./cu. ft. were prepared from various representative pulps and dried in an oven, Despatch Model PLHD-2-5, containing ten drawers. Before the tiles were introduced for drying the oven and circulation fan were started with the fan providing an air velocity of about 175 f.p.m. and the oven brought to the desired drying temperature. The tiles were introduced with surface thermocouples on the upper tile surface and were dried at the indicated temperatures to the indicated dryness for periods of time varying between about 90 minutes and about 140 minutes. In order to duplicate conditions existing in tunnel driers commonly used in commercial production the tiles were dried under high humidity conditions, i.e., above 80% relative humidity, for about the first 25% of the drying time. The tile were compared according to degree of discoloration based upon the following standards.

Color No.: Description
1 -------- Clear surfaces, edges and interior. Some slight scorching allowed.
2 -------- At least one side all tan, some light brown but mostly yellowish. No black or brown edges.
3 -------- Clear interior, light brown to tan exterior. Usually charred edges.
4 -------- Brown to dark brown surface. Edges charred but not soggy.
5 -------- Dark brown to black even in tile interior. Charred, soggy, crumbly edges.

The following is the tabulated results of the discoloration comparisons:

TABLE I

| Retardant [1] | Decomposition Inhibitor (wt. ratio of retardant to inhibitor) (urea) | Drying Temperatures (° F.) | Moisture Remaining (Percent) | Color Number [2] |
|---|---|---|---|---|
| 1 .......... Monoammonium dihydrogen phosphate | | 365 | 9 | 3.5 |
| 2 .............. do | 1:0.2 | 365 | 9 | 2.0 |
| 3 .............. do | 1:0.5 | 365 | 9 | 1.5 |
| 4 .............. do | | 340 | 2 | 5.0 |
| 5 .......... Diammonium hydrogen phosphate | | 340 | 2 | 5.0 |
| 6 .......... Monoammonium dihydrogen phosphate | 1:0.2 | 340 | 2 | 2.5 |
| 7 .............. do | 1:0.5 | 340 | 2 | 2.0 |
| 8 .............. do | | 300 | 2 | 3.0 |
| 9 .......... Diammonium hydrogen phosphate | | 300 | 2 | 3.5 |
| 10 ......... Monoammonium dihydrogen phosphate | 1:0.2 | 300 | 2 | 1.5 |
| 11 ............. do | 1:0.5 | 300 | 2 | 1.5 |

[1] The monoammonium dihydrogen and diammonium hydrogen phosphate used was 15% by weight based on total dry weight of the tile.
[2] When color numbers are above about 2.5 the degree of discoloration is considered "objectionable" and unacceptable.

As can be observed from Table 1 when the ammonium phosphate retarded tiles (1), (4), (5), (8) and (9) were subjected in the drying operation to drying temperatures above the decomposition temperatures of the ammonium phosphates and within the range of about 300 to 365° F. when producing a dry tile, i.e., one containing less than about 10% remaining moisture, they exhibited discoloration to an objectionable degree. However, when the decomposition inhibitor, such as urea, was used in minor amounts under identical conditions significant improvement in the discoloration of the tiles were achieved and acceptable tiles were produced. This, of course, dramatically illustrates the effect of using minor amounts of the decomposition inhibitor to prevent or minimize the heretofore problem of discoloration when using fire retardants, such as the ammonium phosphates, under normal drying conditions.

It should be noted that although urea was used in the foregoing tests as the decomposition inhibitor, other compounds including ammonium carbonate, ammonium bicarbonate, ammonium chloride, ammonium fluoride, ammonium sulfide, hydroxy amine chloride, hydroxy amine fluoride, formamide, acetamidine, guanidine, or mixtures of the foregoing, with urea or without urea, can, in most cases, be substituted for urea and be used as the decomposition inhibitor in practicing this invention.

Although the present invention has been described with a degree of specificity and details it is intended that it be limited only by the claims appended hereto.

We claim:

1. In a method for producing wood fiber products wherein said product is treated with an aqueous solution of an ammonium phosphate fire retardant and thereafter dried, the improvement comprising treating said wood fiber product, prior to drying, with a decomposition inhibitor of an inorganic ammonium compound which releases ammonia below the decomposition temperature of said fire retardant selected from the group consisting of ammonium carbonates, ammonium chloride, ammonium fluoride and ammonium sulfide, and drying said wood fiber product at temperatures in excess of the decomposition temperatures of said fire retardant, said decomposition inhibitor being used in amounts of retardant to decomposition inhibitor on a weight ratio basis of between about 1:.1 to 1:.5 in order to prevent objectionable discoloration of said fiber product as a result of decomposition of said fire retardant.

2. In a method for producing wood fiber products wherein said product is treated with an aqueous solution of an ammonium phosphate fire retardant and thereafter dried, the improvement comprising treating said wood fiber product with a decomposition inhibitor which releases ammonia below the decomposition temperature of said fire retardant selected from the group consisting of ammonium carbonates, ammonium chloride, ammonium fluoride and ammonium sulfide, said decomposition inhibitor being used in amounts of retardant to decomposition inhibitor on a weight ratio basis of between about 1:.1 to 1:.5, and drying said product at temperatures in excess of the decomposition temperatures of said fire retardants for a time sufficient to produce a substantially dry product which does not exhibit an objectionable degree of discoloration.

3. In a method for producing wood fiber products having densities within the range of about 10 to 25 lbs. per cu. ft. wherein said product is treated with an aqueous solution of an ammonium phosphate fire retardant and thereafter dried, said ammonium phosphates being used in amounts within the range of about 5 to 30% by weight of said product on a dry basis, the improvement comprising treating said product with a decomposition inhibitor in amounts of retardant to decomposition inhibitor on a weight ratio basis of between about 1:.1 to 1:.5, said decomposition inhibitor being an inorganic ammonium compound which releases ammonia below the decomposition temperature of said fire retardant selected from the group consisting of ammonium carbonates, ammonium chloride, ammonium fluoride and ammonium sulfide, and drying said product at temperatures in excess of the decomposition temperature of said fire retardants and for a time sufficient to produce a substantially dry product which does not exhibit an objectionable degree of discoloration.

4. In the method of claim 3, wherein said decomposition inhibitor is an ammonium carbonate.

5. In the method of claim 3, wherein said decomposition inhibitor is ammonium chloride.

References Cited

UNITED STATES PATENTS

| | | | |
|---|---|---|---|
| 1,612,104 | 12/1926 | Eichengrun | 106—15 |
| 2,036,854 | 4/1936 | Dickie | 252—8.1 |
| 2,097,509 | 11/1937 | Boller | 106—15 |
| 2,386,471 | 10/1945 | Jones et al. | 252—8.1 |
| 2,415,112 | 2/1947 | Seymour et al. | 252—8.1 |
| 2,771,379 | 11/1956 | Di Dario | 252—8.1 |
| 2,935,471 | 5/1960 | Aarons | 106—15 |
| 1,691,726 | 11/1928 | Lichtenstadt | 117—151 |
| 1,766,606 | 6/1930 | Coolidge | 117—38 |
| 2,142,116 | 1/1939 | Cupery | 117—138 |
| 2,778,365 | 1/1957 | Silverman et al. | 117—138 |

FOREIGN PATENTS 759,931  10/1956  Great Britain.

JAMES A. SEIDLECK, *Primary Examiner.*

L. B. HAYES, *Assistant Examiner.*